US005953374A

United States Patent [19]

Yeh

[11] Patent Number: 5,953,374

[45] Date of Patent: Sep. 14, 1999

[54] BANDPASS SPECTRAL SHAPING OF DATA SIGNALS

[75] Inventor: Han C. Yeh, Sunnyvale, Calif.

[73] Assignee: PC-Tel, Inc., San Jose, Calif.

[21] Appl. No.: 08/811,097

[22] Filed: Mar. 3, 1997

[51] Int. Cl.[6] .......... H04B 14/04

[52] U.S. Cl. .......... 375/242; 375/222; 370/507; 341/144; 341/145

[58] Field of Search .......... 341/122–123, 341/145–144; 375/222, 242; 370/496, 507

[56] References Cited

U.S. PATENT DOCUMENTS

| | | | |
|---|---|---|---|
| 4,403,331 | 9/1983 | Halpern et al. | 375/37 |
| 4,903,292 | 2/1990 | Dillon | 379/93 |
| 5,394,437 | 2/1995 | Ayanoglu et al. | 375/222 |
| 5,455,839 | 10/1995 | Eyuboglu | 375/265 |
| 5,546,395 | 8/1996 | Sharma et al. | 370/84 |
| 5,687,194 | 11/1997 | Paneth et al. | 375/283 |

OTHER PUBLICATIONS

Telecommunications Industry Association TR–30 Committee Contribution, "DC Suppresser for 56 K Modems," pp. 1–2 (Oct. 16–17, 1996).

Telecommunications Industry Association TR30.1 Group Contribution, "A Spectral Shaping Technique for PCM Modems," pp. 1–4 (Nov. 13–15, 1996).

*Primary Examiner*—Stephen Chin
*Assistant Examiner*—Joseph Roundtree
*Attorney, Agent, or Firm*—Skjerven, Morrill, MacPherson, Franklin & Friel LLP; David T. Millers

[57] ABSTRACT

A process for transmitting data selects sample values that represent data symbols and then converts the sample values to voltage levels in a transmitted PAM signal. A receiver samples the PAM signal and identifies the data symbols from the sampled voltage levels. At least some of the data symbols have multiple alternative representations; and for a data symbol having multiple alternatives, a sample value is selected to reduce low and high frequency components in the PAM signal. Accordingly, the PAM signal carries less information at low and high frequencies and is less disturbed by transformers, low pass filters, and local loop impairment in the transmission channel. The process for selecting sample values determines a weighted average of the lowest and highest frequency components. The weighting of the average can be selected according to a measured frequency response of the channel during initialization.

12 Claims, 4 Drawing Sheets

BANDPASS SPECTRAL SHAPING OF DATA SIGNALS

BACKGROUND

1. Field of the Invention

This invention relates to modems and to methods for encoding data for transmission through an analog communication system.

2. Description of Related Art

Frequency responses in analog communication systems may limit the rate or quality of information transmissions. For example, current telephone networks often employ transformers that have a frequency null at 0 Hz (i.e. for a DC signal component) and strong attenuation and non-linear distortion for signal components having frequencies less than about 100 Hz. Accordingly, signals having low frequency components that carry information are subject to information loss when transmitted through conventional telephone networks. Such losses can be a problem for modems that are connected through telephone networks.

A proposed 56 kbit/s PCM modem generates a digital PCM (pulse code modulated) signal having a sampling frequency of 8 kHz. The PCM signal is sent in digital form to a telephone system central office where the PCM signal is converted to an analog or PAM (pulse amplitude modulated) signal for transmission on a local loop. When generating the PCM signal, the PCM modem may use a one-to-one mapping from 7-bit data symbols to sample values in the PCM signal. For example, each sample value may represent and be equal to a 7-bit data symbol. For a conventional one-to-one mapping of uncorrelated digital data, the analog or PAM signal that results from digital-to-analog conversion of the PCM signal has a frequency spectrum that is essentially flat from 0 Hz up to a cut-off frequency of 4 kHz (i.e. half the sampling frequency). Accordingly, transformers in the telephone network can distort the information signal and degrade modem performance by attenuating the low frequency components relative to other components in the PAM signal.

Techniques have been proposed that change the spectrum of a PAM signal to reduce the DC component. A paper entitled "A Spectral Shaping Technique for PCM Modems," by Vedat Eyuboglu, that was submitted to the Telecommunications Industry Association (TIA), TR30.1 Ad-Hoc Group Meeting on PCM Modems on Nov. 13–15, 1996 proposed a mapping technique where the set of PCM sample values is larger that the set of data symbols, so that some data values can be represented by either of two alternative PCM sample values. The mapping, when possible, selects the one of the two alternative PCM sample values that minimizes the relative magnitude of the DC component of the analog signal so that transformers distort the PAM signal less. A second technique described in a paper entitled "DC Suppressor for 56K Modems," submitted by RSA Communications to the TR30.1 Ad-hoc Committee on Oct. 16, 1996 changes the sign of selected sample values in the PCM signal to minimize the DC component in the PAM signal. This technique adds overhead bits to indicate whether the signs of sample values have been changed so that a receiver can correct the signs if necessary when decoding data.

Even with these techniques, a communication systems may still distort the analog (or PAM) signal because the proposed mapping only compensates for variations in frequency response at low frequencies and other sources of variations in frequency response may be present. For example, a digital-to-analog converter that converts a PCM signal to a PAM signal may include a low pass filter that eliminates high frequency components that result from aliasing and the local loop may have a frequency response that suppresses or distorts the high frequency components. Thus, a telephone network may distort desired high frequency components of an information signal. An adaptable transmission process is desired that reduce the problems of high and low frequency distortions.

SUMMARY

In accordance with an aspect of the invention, samples in PCM signal are processed to minimize both high and low frequency components in an analog or PAM signal. In an exemplary embodiment, a process determines two indicators, a DC indicator indicating the magnitude of a DC component and a high-frequency indicator indicating the highest frequency component. The DC indicator can be, for example, a sum of the amplitudes of the PAM signal. The high frequency indicator can be for example, a sum of the amplitudes where the sign of every other sample is reversed. The processing changes a sample value if an alternative sample value provides a lower weighted average of the absolute values of the two indicators. The alternative values can be provide by either of the above-described techniques. In particular, either some of the data symbols have two or more alternative representations as samples or the negative of a sample value and overhead bits are set to indicate any changes in samples used. For such processes, high frequency distortion in a telephone network affects information in the transmitted signal less.

As a further aspect of the invention, an initialization or handshake procedure measures the relative attenuation of the DC and high frequency components in a communication channel, and the weighting for the average of the DC and high-frequency components is selected according to the measured frequency response.

One embodiment of the invention is a process for transmitting a series of data symbols. For each data symbol, a transmitter selects a sample value that represents the data symbol, and the sample value is converted to a voltage amplitude in a transmitted signal. The sample values may be, for example, in a pulse code modulated (PCM) signal from the transmitter that is later converted to a pulse amplitude modulated (PAM) signal. The transmitter uses the sample values when determining indicators of the magnitudes of a first (e.g. DC) component and a second (e.g. highest) frequency component of the transmitted signal, and uses the indicators in the process of selecting sample values when alternatives are available. For example, some data symbols may be represented by two or more alternative sample values, so that any of the alternative sample values can be selected for the data symbol. In accordance with an aspect of the invention, the transmitter selects a sample value from the possible alternative sample values so that the first and second frequency components are minimized in the transmitted signal.

In an exemplary embodiment, for each data symbol Di where i is an index indicating a position of data symbol Di in the series, the transmitter determines or updates first and second indicators by: determining a value S[Pi] representing the voltage amplitude generated by converting a sample value Pi representing the data symbol Di; adding to the first indicator a contribution proportional to value S[Pi] and adding to the second indicator a second contribution proportional to a product of $(-1)^i$ and S[Pi]. A weighted average that is the sum of the absolute value of a product of a fraction x and the first indicator and the absolute value of a product of a fraction (1−x) and the second indicator. The fraction x may be fixed or selected according to the frequency response of the channel as measured during an initialization or handshake procedure. In a limiting case, fraction x is equal to zero or one, and only the high frequency component is reduced.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
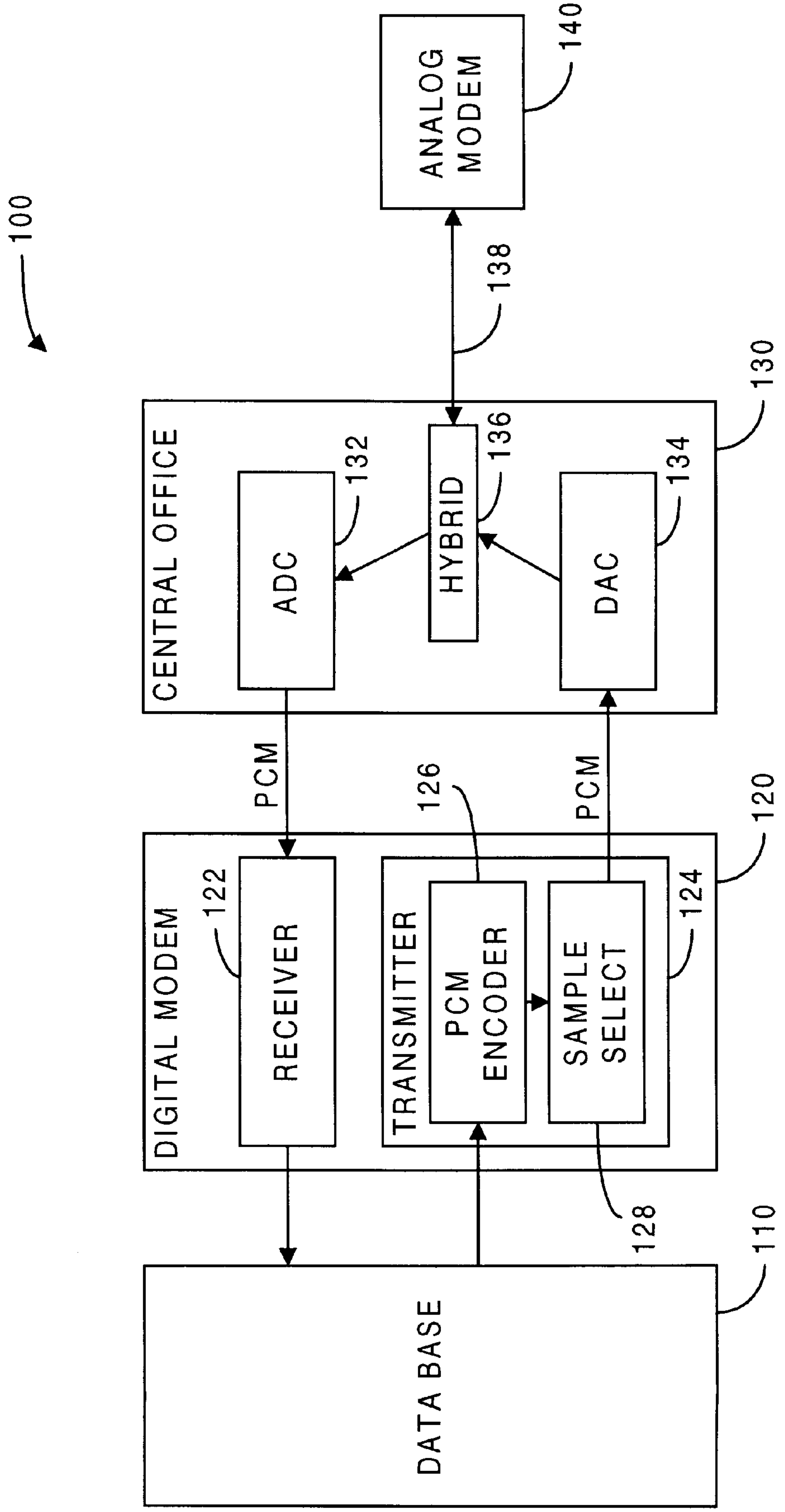
FIG. 1 illustrates a digital modem connected to an analog modem through a telephone system.

FIG. 1 illustrates a communication system 100 in which an embodiment of the invention may be employed. Communication system 100 includes a digital (or PCM) modem 120, a telephone system central office 130, and an analog modem 140. Modem 120 includes a transmitter 124 that generates a pulse code modulated (PCM) signal representing data from a data base 110. The PCM signal may be a bit stream that includes a series of frames containing multi-bit sample values. The rate at which PCM sample values are transmitted is referred to herein as the sampling rate or frequency. A digital-to-analog converter (DAC) 134 converts the PCM signal into an analog or pulse amplitude modulated (PAM) signal transmitted over a local loop 138 to analog modem 140. Typically, DAC 134 implements a non-linear digital-to-analog conversion such as in well known $\mu$-law and A-law coding. Specifically, for a telephone network in the United States, DAC 134 performs a conversion that complies with a standard referred to as ITU G.711, for pulse code modulation of voice frequencies.

In accordance with an embodiment of the invention, a PCM encoder 126 in transmitter 124 receives data from data base 110, breaks the data into a series of multi-bit symbols, and maps the each symbol into a PCM sample value. For each PCM sample value from PCM encoder 126, a sample select circuit 128 in transmitter 124 selects and transmits either the PCM sample value or an alternative PCM sample value for the PCM sample from encoder 126.

The set of alternatives available for selection depends on the encoding method employed. For a first method, a mapping permits selection from two or more PCM sample values that represent the same data symbol for at least some of the data symbols. For the second method, the alternative sample values are a function of the sample value from encoder 126, for example, an alternative for each sample may be the negative of the sample; and overhead bits are added to the PCM signal to indicated to a decoder in modem 140 whether the original sample from PCM encoder 126 or the alternative (i.e. negative) sample has been used.

As the PCM sample values are sequentially transmitted, select circuit 128 maintains running totals SUM1 and SUM2 indicated in equations 1 and 2.

$$\mathrm{SUM1}=S[P0]+S[P1]+\ldots S[Pi] \qquad \text{Equation 1}$$

$$\mathrm{SUM2}=S[P0]-S[P1]+\ldots (-1)^{i}S[Pi] \qquad \text{Equation 2}$$

In equations 1 and 2, i is an index identifying the last PCM sample value, P0 to Pi are the transmitted PCM sample values, and S[P] indicates the amplitude that DAC 134 generates from PCM sample value P. Value SUM1 indicates the magnitude of the low frequency components of the transmitted signal, and value SUM2 indicates the magnitude of the high frequency components which oscillate at a frequency that is about half the sampling frequency.

When alternative PCM sample values P and P' are available for a digital symbol D, the PCM sample value P or P' that minimizes a weighted average SUM of Equation 3 is selected and transmitted.

$$\mathrm{SUM}=x*|\mathrm{SUM1}|+(1-x)*|\mathrm{SUM2}| \qquad \text{Equation 3}$$

In equation 3, x is a constant between 0 and 1, and may be determined during a modem handshake procedure described below.

Figure 2:
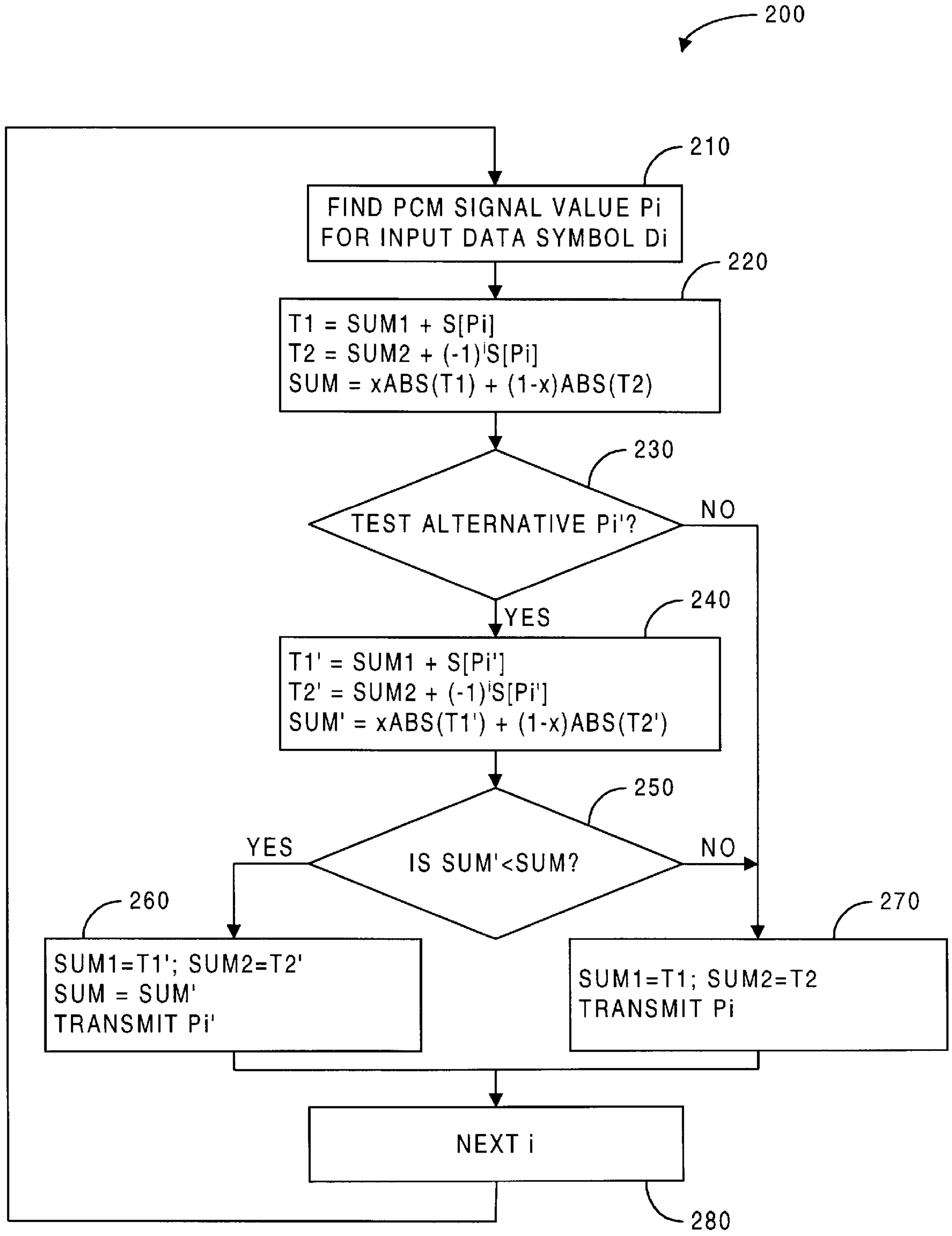
FIG. 2 shows a flow diagram of a data transmission process in accordance with an embodiment of the invention.

FIG. 2 illustrates an exemplary process 200 used by transmitter 124 when generating the series of PCM sample values representing transmitted data. Process 200 generates one PCM sample value for each period of the sampling frequency. An index i and average SUM are initially zero, and an incoming bit stream is partitioned to extract data symbols Di and encode the each data symbol Di as a sample value Pi. In the exemplary embodiment, which is a 56 kbit/s PCM modem, the data symbols are 7-bit values, the sampling frequency is 8 kHz, and PCM sample values Pi are 8-bit values to be converted to a PAM signal in accordance with the ITU G.711 standard. In step 210, encoder 126 finds a PCM sample value Pi for data symbol Di.

Value SUM is conditionally updated in step 220. The update in step 220 is conditional because value SUM is later changed in a step 260 if an alternative PCM signal Pi' value is selected. To update indicator SUM, temporary values T1 and T2 are determined using sample value Pi according to equations 1 and 2 and the conversion function S[Pi]. In the exemplary embodiment function S[Pi] is defined by the G.711 standard. Indicator SUM1 (T1) is a running total of amplitudes S[Pi] which may be positive or negative. For indicator SUM2, addition and subtraction of amplitudes S[Pi] alternate at the sampling frequency, 8 kHz, so that the contribution of the repeated additions and subtractions indicate the magnitude of a highest frequency (4 kHz) signal component.

In step 230, select circuit 128 determines whether the sample value Pi is eligible for replacement by an alternative. Many alternatives for replacement are possible. For one embodiment, there are 128 possible 7-bit data symbols and up to 256 possible sample values Pi so that some or all of the data symbols can be equally represented by either of two sample values Pi and Pi'. (Some sample values could be unusable if the sample value would cause DAC 134 to generate a voltage amplitude in the PAM signal that exceeds a power constraint for the telephone network or for modems.) For another embodiment, an alternative sample value Pi' is the negative of sample value Pi. A bit in the data represented by the PCM signal can be set to indicate that a particular sample Pi does not have its usual interpretation but is the negative of the actual sample value Pi normally representing data symbol Di. Other methods for selecting alternatives are known and usable by selection circuit 128.

If no alternative is available or if consideration of an alternative is otherwise skipped for the data symbol, transmitter 124 selects and transmits PCM sample value Pi in step 270. If an alternative PCM sample value Pi' is to be considered, a value SUM' is determined according to equations 1 and 2 under the assumption that sample value Pi' is transmitted. A step 250 compares values SUM and SUM' to determine which is smaller. If value SUM is not greater than value SUM', process 200 transfers to step 270 to select and transmit PCM sample value Pi. If value SUM' is smaller than value SUM, process 200 transfers to step 260 to select and transmit PCM sample value Pi' and set value SUM equal to value SUM'. Once the PCM sample value Pi or Pi' providing the smallest value SUM is transmitted, step 280 increments index i, and transmitter 124 repeats process 200 for the next 7-bit data symbol Di.

In FIG. 1, DAC 134 converts the PCM signal to a PAM single have a series of steps that change voltage level at about the sampling frequency (8 kHz). An analog-to-digital converter (ADC) in analog modem 140 samples an incoming PAM signal to extract samples that are converted to digital PCM sample values in a process that is the inverse of conversion performed by DAC 134. A receiver in analog modem 140 uses the mapping from PCM sample values (and possible overhead bits within the data stream) to extract the transmitted data symbols.

In accordance with a further aspect of the invention, the fraction x in Equation 3 (and used in process 200 of FIG. 2) can be selected during an initialization procedure or handshake sequence between modems. For example, during a handshake sequence between modems 120 and 140 of FIG. 1, a probing process similar to phase 2 in the well known V.34modem protocol can measure the characteristics of the channel between modems 120 and 140. Such probing transmits a signal containing a plurality of discrete frequency components of equal magnitude and observes the attenuation of each component. Parameter x is then selected so that the shape of the frequency spectrum of a PAM signal representing uncorrelated data matches the attenuation pattern measured during probing.

Figure 3A:
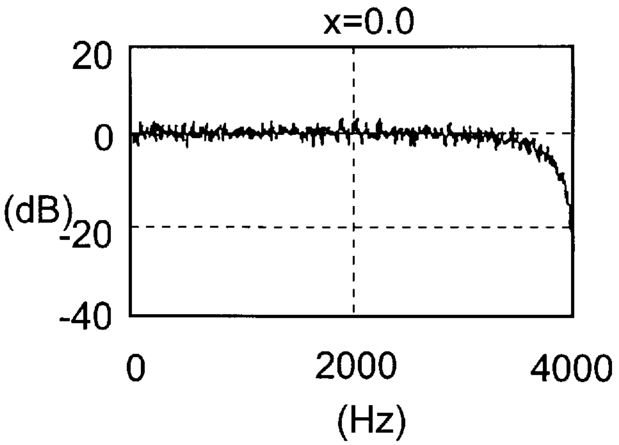
FIGS. 3A, 3B, 3C, 3D, and 3E illustrate possible frequency spectrums for transmission signals generated in accordance with embodiments of the invention.
Figure 3B:
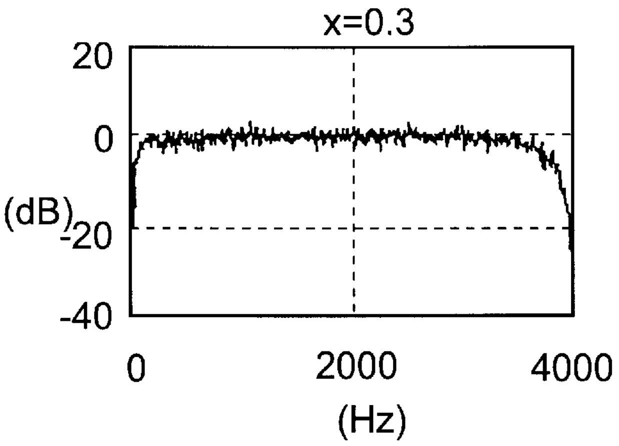
Figure 3C:
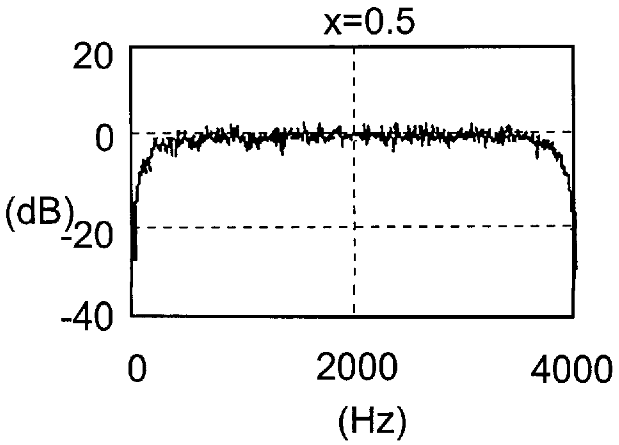
Figure 3D:
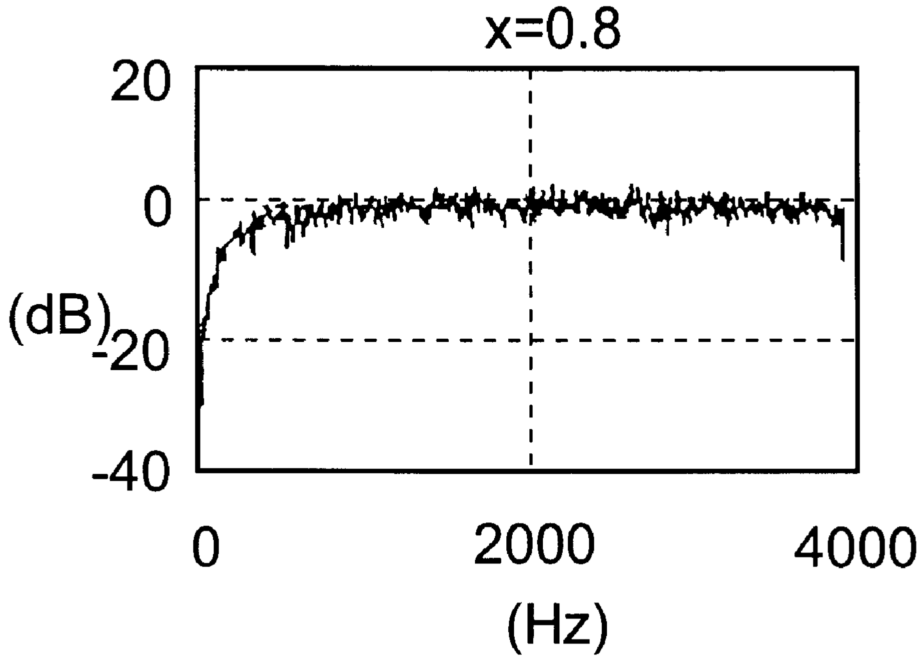
Figure 3E:
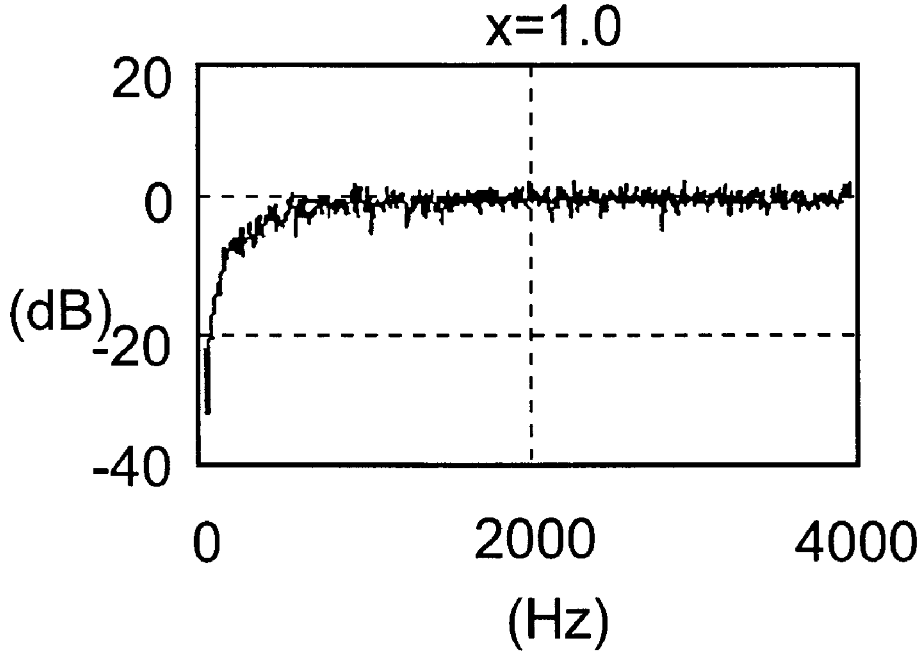

FIGS. 3A, 3B, 3C, 3D, and 3E illustrate the relative frequency spectrum of simulated PAM signals generate with fraction x respectively equal to 0, 0.3, 0.5, 0.8, and 1. For x equal to zero as in FIG. 3A, the PCM signal selection process behaves like a high pass filter which attenuate high frequency components. For x equal to 0.5 as in FIG. 3C, the PCM selection process behaves like a symmetric bandpass filter which attenuate high and low frequency components equally. For x equal to 1 as in FIG. 3E, the PCM selection process behaves like a low pass filter which attenuate low frequency components. FIGS. 3B and 3D illustrate intermediate cases where the PCM sample value selection process behaves as an asymmetric bandpass filter.

The spectrum for a PAM signal representing uncorrelated data can also be changed by the number of possible changes in sample values made by sample select circuit 124. This can be achieved by limiting changes to every N out of M data symbols or varying the number of possible alternative allowed. Varying the number of possible changes changes the slope of the frequency spectrum at both high and low frequencies.

Although the invention has been described with reference to particular embodiments, the description is only an example of the invention's application and should not be taken as a limitation. For example, although an embodiment of the invention for use in a 56K PCM modem is describe, the embodiments of invention include other types of modems and information system. Various adaptations and combinations of features of the embodiments disclosed are within the scope of the invention as defined by the following claims.

We claim:

1. A process for transmitting a series of data symbols, wherein for each data symbol in the series, the process comprises:

selecting a sample value that represents the data symbol;

converting the sample value to a voltage amplitude in a transmitted signal; and using the sample value when determining a weighted average of a first indicator indicating a magnitude of a first frequency component of the transmitted signal and a second indicator indicating a magnitude of a second frequency component of the transmitted signal, and wherein for a first data symbol from the series, selecting a sample value comprises selecting a first sample value from a plurality of sample values that represent the first data symbol, the first sample value minimizing the weighted average.

2. The process of claim 1, wherein the first frequency component has a lowest frequency in the transmitted signal and the second frequency component has a highest desired frequency in the transmitted signal.

3. The process of claim 2, wherein the first frequency component is a DC component.

4. The process of claim 1, wherein converting the sample values to voltage amplitudes comprises sequentially converting sample values at a rate determined by a sampling frequency, and the second frequency component of the transmitted signal has a frequency that is half of the sampling frequency.

5. The process of claim 1, further comprising:

testing a frequency response of a channel on which the transmitted signal is transmitted; and selecting the weighted average according to the frequency response of the channel.

6. The process of claim 5, wherein the testing is performed as part of a handshake procedure between communication devices connected via the channel.

7. The process of claim 1, wherein, for each data symbol Di where i is an index indicating a position of data symbol Di in the series, determining the indicator comprises:

determining a value S representing the voltage amplitude generated by converting a sample value Pi selected for the data symbol Di;

adding to the first indicator a contribution proportional to S[Pi]; and adding to the second indicator a contribution proportional to a product of $(-1)^i$ and S[Pi].

8. The process of claim 1, wherein the weighted average comprises the sum of the absolute value of a product of a fraction x and the first indicator and the absolute value of a product of (1−x) and the second indicator, wherein fraction x is less than 1.

9. The process of claim 8, further comprising:

testing a frequency response of a channel on which the transmitted signal is transmitted; and selecting the fraction x according to the frequency response of the channel.

10. The process of claim 1, wherein the plurality of sample values that represent the first data symbol, includes a sample value that without a sign change represents the first data symbol and a sample value that after a sign change represents the first data symbol, and the method further comprises adding to the transmitted signal an indication of whether a sign change is required for the sample value.

11. A process for transmitting a series of data symbols, comprising:

selecting for each data symbol a sample value that represents the data symbol; and sequential converting sample values at a sampling frequency, into voltage amplitudes in a transmitted signal; and using the sample values when determining an indicator of a magnitude of a frequency component in the transmitted signal, the frequency component having a frequency that is half of the sampling frequency, and wherein for a first data symbol from the series, selecting a sample value comprises:

identifying a plurality of sample values that represent the first data symbol; and selecting a first sample value from the plurality of sample values, the first sample value minimizing the magnitude of the frequency component in the transmitted signal.

12. The process of claim 10, wherein, for each data symbol Di where i is an index indicating a position of data symbol Di in the series, determining the indicator comprises:

determining a value S representing a voltage amplitude generated in the transmitted signal by converting a sample value Pi selected for the data symbol Di; and adding to the indicator a contribution proportional to a product of $(-1)^i$ and S[Pi].

* * * * *

UNITED STATES PATENT AND TRADEMARK OFFICE

CERTIFICATE OF CORRECTION

PATENT NO. : 5,953,374
DATED : September 14, 1999
INVENTOR(S) : Yeh, Han C.

It is certified that error appears in the above-identified patent and that said Letters Patent is hereby corrected as shown below:

Column 2,
Line 3, after "ing" insert -- , --; and

Column 4,
Line 37, between "embodiment" and "function" insert -- , --.

Signed and Sealed this

Second Day of April, 2002

Attest:

JAMES E. ROGAN
*Director of the United States Patent and Trademark Office*

*Attesting Officer*